(12) United States Patent
Maziewski et al.

(10) Patent No.: US 10,694,304 B2
(45) Date of Patent: Jun. 23, 2020

(54) PHASE RESPONSE MISMATCH CORRECTION FOR MULTIPLE MICROPHONES

(71) Applicant: Intel Corporation, Santa Clara, CA (US)

(72) Inventors: Przemyslaw Maziewski, Gdansk (PL); Lukasz Kurylo, Gdansk (PL); Piotr Chlebek, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/573,581

(22) PCT Filed: Jun. 26, 2015

(86) PCT No.: PCT/PL2015/000105
§ 371 (c)(1),
(2) Date: Nov. 13, 2017

(87) PCT Pub. No.: WO2016/209098
PCT Pub. Date: Dec. 29, 2016

(65) Prior Publication Data
US 2018/0359584 A1   Dec. 13, 2018

(51) Int. Cl.
*H04R 29/00* (2006.01)
*H04R 1/40* (2006.01)
(Continued)

(52) U.S. Cl.
CPC .......... *H04R 29/006* (2013.01); *H04R 1/406* (2013.01); *H04R 3/005* (2013.01); *H04R 29/005* (2013.01);
(Continued)

(58) Field of Classification Search
None
See application file for complete search history.

(56) References Cited

U.S. PATENT DOCUMENTS

| 5,778,082 A * | 7/1998 | Chu ......................... H04N 7/15 348/14.07 |
| 2008/0175407 A1 * | 7/2008 | Zhang .................... H04R 3/005 381/92 |

(Continued)

FOREIGN PATENT DOCUMENTS

WO   WO 2015/013598   1/2015

OTHER PUBLICATIONS

PCT Notification of International Preliminary Report on Patentability and Written Opinion of the International Searching Authority for International Application No. PCT/PL2015/000105, dated Jan. 4, 2018, 8 pages.

(Continued)

*Primary Examiner* — Antim G Shah
(74) *Attorney, Agent, or Firm* — International IP Law Group, P.L.L.C.

(57) ABSTRACT

For a multiple microphone system, a phase response mismatch may be corrected. One embodiment includes receiving audio from a first microphone and from a second microphone, the microphones being coupled to a single device for combining the received audio, recording the received audio from the first microphone and the second microphone before combining the received audio, detecting a phase response mismatch in the recording at the device between the audio received at the second microphone and the audio received at the first microphone, if a phase response mismatch is detected, then estimating a phase delay between the second microphone and the first microphone, and storing the estimated phase delay for use in correcting the phase delay in received audio before combining the received audio.

20 Claims, 8 Drawing Sheets

(51) Int. Cl.
*H04R 3/00* (2006.01)
*H04R 25/00* (2006.01)
*H04M 3/56* (2006.01)

(52) U.S. Cl.
CPC ...... *H04M 3/568* (2013.01); *H04M 2203/509* (2013.01); *H04R 25/407* (2013.01)

(56) References Cited

U.S. PATENT DOCUMENTS

2009/0323980 A1* 12/2009 Wu ................. H04R 3/005
381/92
2014/0363001 A1* 12/2014 Huang ............... H04R 29/005
381/58

OTHER PUBLICATIONS

PCT International Search Report nand Written Opinion if the International Searching Authority for International Application No. PCT/PL2015/000105, dated Mar. 16, 2016, 10 pages.

* cited by examiner

PHASE RESPONSE MISMATCH CORRECTION FOR MULTIPLE MICROPHONES

CROSS-REFERENCE TO RELATED APPLICATION

This patent application is a U.S. National Phase Application under 35 U.S.C. § 371 of International Application No. PCT/PL2015/000105 filed Jun. 26, 2015, entitled PHASE RESPONSE MISMATCH CORRECTION FOR MULTIPLE MICROPHONES.

FIELD

The present description relates to the field of computing devices with multiple microphones and, in particular, correcting for phase response differences between audio received from multiple microphones.

BACKGROUND

Computing and communications devices are increasingly being fitted with multiple microphones. As microphones become smaller and less expensive and as audio processing becomes more powerful, the microphones may be used to add additional functions to a computing or communication device. These new functions include improved noise reduction, improved speech recognition, and identification of different speakers or noise sources. The microphones may also be used to add depth and space to the received sound. By analyzing differences between the sounds received at each microphone these functions and many more may be provided.

Multiple microphone systems are used by conference room and exhibit space communications systems, by desktop workstations and computers, by automotive infotainment systems, and also by portable computing and communications devices. Some video game and television systems also use microphones for game play or to control viewing options. With the increased use and variety of handheld and wearable communications devices, speech understanding and audio quality have become increasingly important. Any of these devices may be equipped to receive speech and other audio, to record the audio, to use the received speech for conversations with other people in other locations and to use the speech for voice command.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
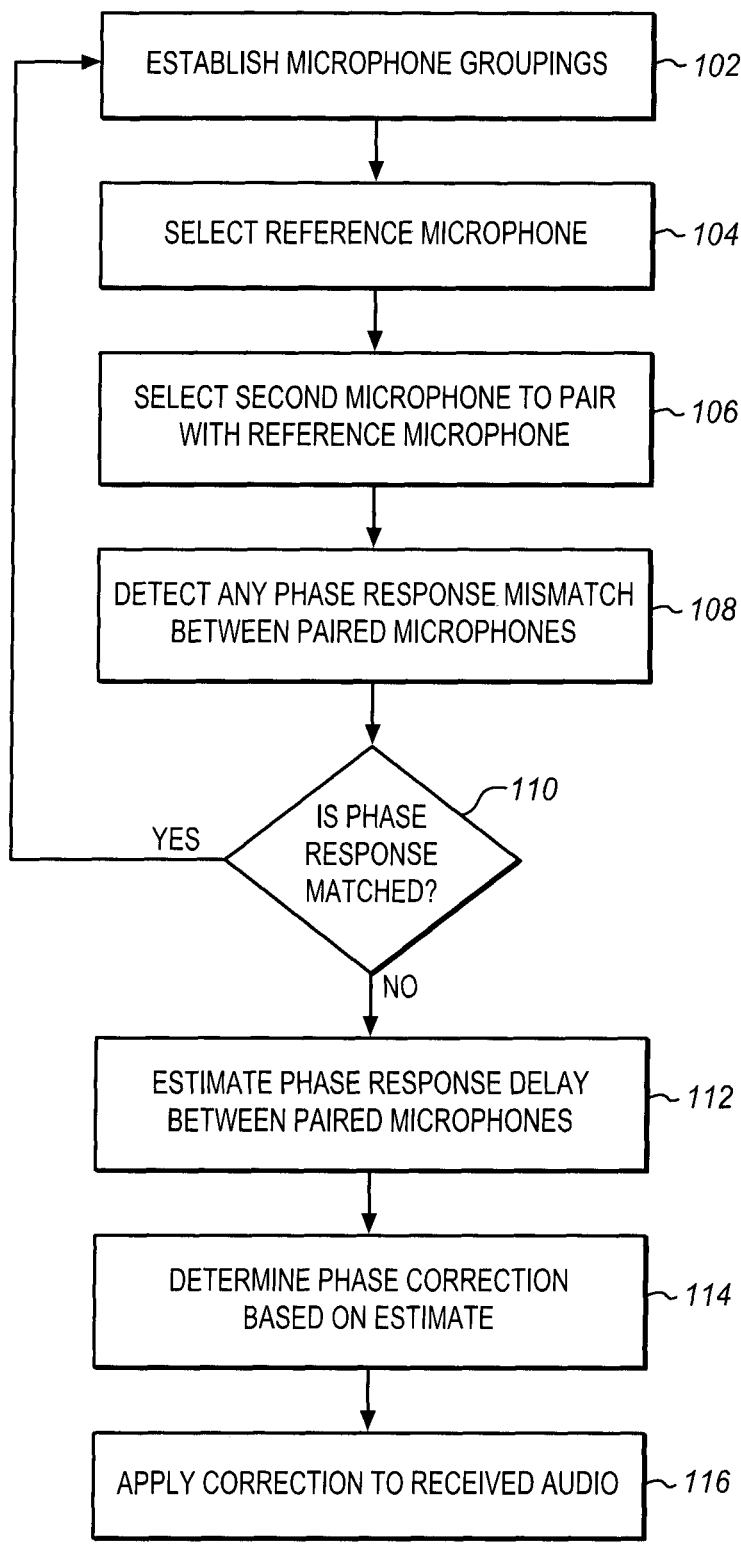
FIG. 1 is a generalized process flow diagram of detecting and correcting phase response mismatch in a multiple microphone system according to an embodiment.

In order to use multiple microphones for beam steering, spatial and depth location, stereo recording and many other functions, the time of arrival or the phase of the audio at each microphone is compared. A computer, tablet, slate, telephone, or wearable device may have two or more microphones on each side of the device to allow sounds to be received clearly in different directions. A fixed system may have microphones distributed across a display or around a room. The difference in arrival time and phase may be determined after the audio from each microphone is received, amplified, converted to a digital signal, and optionally converted to a frequency domain from a time domain.

In many cases, the microphones do not have a linear or a matched-phase response. The phase response may not be matched in that the spectral components of audio from one microphone always arrives at the audio processor or codec before or after spectral components of the audio from the other microphone. As an example, a phase mismatch may cause an audio source to seem always to be farther from the delayed microphone than it actually is. The phase response may not be linear in that it changes with frequency, lower frequency sounds will have a different delay from higher frequency sounds. This can cause errors and instability in later processing when more than one frequency is used. The frequency dependency may also be different with different microphones. Differences in the non-linearity for example, will cause an audio source to seem to move as the audio changes pitch. A lower frequency sound will seem to be coming from a different position than a higher frequency sound.

The differences may be caused by differences in the hardware signal processing chain, differences in the microphones, differences in the microphone housings, etc. If synchronized sounds arrive out of phase, then the time or arrival or the phasing cannot be relied upon for beam forming, spatial, and depth detection systems.

As described herein, the signals from each microphone may be compared and corrected. Phase differences are detected, estimated and then the phase response of the microphones are corrected. The techniques described herein may be applied to fixed and mobile devices such as tablets, telephones, notebooks, all-in-one computers, televisions, television accessories, wearables, and in vehicle audio and video systems.

A delay estimation is performed between the microphones. This may be done by selecting a reference or base microphone and then comparing the phase of at each microphone to the reference microphone. Linear- or matched-phase microphones should have zero delay for all audio frequency components when compared against each other. Any delay between any pair of microphones indicates differences between the microphones in the phase response. The delay in phase response may be used for a quick phase mismatch detection as well as for a more precise estimation of the phase differences between the microphones. The more precise estimation may be used to correct the phase difference.

FIG. 1 is a generalized process flow diagram for detecting, estimating, and correcting phase mismatch between two microphones. As shown techniques described herein may be simplified into three steps, phase mismatch detection, phase mismatch estimation and phase mismatch correction. The present disclosure will describe a process for two microphone audio processing pipelines. For a system with three microphones, there will be two pair-wise comparisons, with one microphone selected to be the reference. For a system with four microphones there will be three pair-wise comparisons. The techniques described herein may be extended to many more microphones by detecting and correcting phase mismatch against a single one of the microphones. If there are multiple microphones on different surfaces of the device, then the microphones may be grouped so that microphones are only corrected against microphones that are facing the same direction. The selection of microphones and groupings may be adapted to suit any particular device configuration and planned use.

The techniques described herein are initialized at 102 by determining which microphones are to be grouped together, for example, all microphones on a single surface of the device, all front facing microphones, or all microphones that receive audio in a particular device configuration. With the microphones grouped, one microphone is selected at 104 as a reference microphone. Typically any microphone may be used as the reference. However some devices may have a primary microphone, such as a center microphone or a higher resolution microphone that serves as a reference for other purposes. A second microphone is then selected at 106 for comparison against the reference. Each other microphone may be paired with the reference microphone in turn. The corrections for each pairing may be made independently of each other pairing. As a result, the techniques described herein for one pair may simply be repeated for each other pair.

Having established a microphone pairing, the first operation at 108 is to detect whether there is any significant phase response mismatch between the two microphones of the pair. A phase response mismatch may be detected by analyzing the microphones' responses to a chirp signal or another excitation that is supplied to the microphones. If the phase response is not matched at 110 then the phase response delay may be estimated between microphone pairs at 112. At 114, this phase response delay is used to determine a phase response delay correction. At 116, the correction is applied to the audio as it is received by the microphones.

By setting one of the microphones as the reference microphone, the phase corrections may be configured to adjust the other microphones to the reference microphone. However, since even the reference microphone may not have a linear response across its frequency range, the reference microphone may also have a phase correction. The reference microphone's phase correction may be used to compensate for some frequencies arriving earlier than other frequencies. The other microphones may be corrected with respect to the actual reference microphone response or with respect to the corrected reference microphone. By correcting each of the other microphones with respect to the same reference microphone, they will also be corrected with respect to each other.

Figure 2:
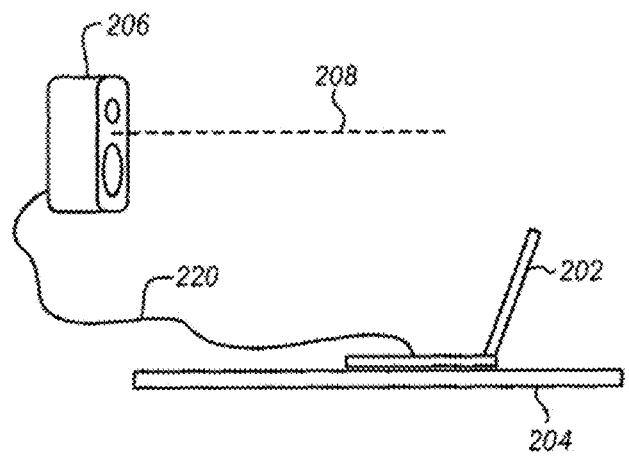
FIG. 2 is a side plan view of a test bench configuration for microphone phase response mismatch with a computing device.

FIG. 2 is a side plan view that shows an example of a test bench configuration that may be used to detect and to estimate a phase mismatch. In this example a notebook computer 202 is placed on a test bench 204 in an open configuration as if in use. An audio source such as a loudspeaker 206 is placed in front of the notebook computer. The loudspeaker is placed in a position that may simulate the position of a user. The acoustical axis 208 of the loudspeaker is horizontal and parallel with the test bench 204. The acoustical axis is raised above the test bench by an amount to simulate a user's head. While the acoustical axis is not incident on the computer, the loudspeaker has a vertical spread that will provide acoustical signals to the computer.

Figure 3:
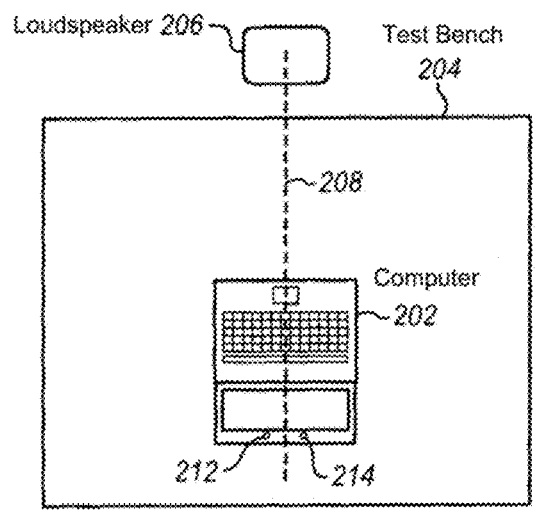
FIG. 3 is a top plan view of the test configuration of FIG. 2 according to an embodiment.

FIG. 3 is a top plan view of the configuration of FIG. 2. As shown, the notebook computer has two microphones 212, 214 in the top horizontal part of the display bezel, one on either side of a centerline of the screen. The microphones may be closer together or farther apart than shown. There may be additional microphones in other positions on the front and on the back. To detect and correct microphone phase for microphones on the back side of the display, the computer may be tested in the position as shown. This may be done, for example, when the back microphone are for noise cancellation or in any situation in which the phase response of the back microphones is to be unified. Alternatively, the computer may be rotated one half circle so that the back of the display is facing the loudspeaker. The loudspeaker is positioned so that the acoustical axis 208 is directly aligned with the centerline of the display. This places the axis at a position that is evenly spaced between the two microphones. As a result, the loudspeaker provides about the same acoustic energy to both microphones. It also provides that the distance from the loudspeaker to each microphone is the same.

The notebook computer may be an ultrabook computer, a laptop computer, or a portable workstation computer. While a notebook computer is shown, the same test configuration may be used for any other type of computer, computing device, or multiple microphone device, such as a standalone external microphone array. An all-in-one computer, whether fixed or portable, may be placed in a similar position. A desktop monitor that includes microphones may also be placed in a similar position. A tablet computer may be placed on a stand or kickstand in a similar position to simulate a desktop configuration or to simulate being held by a user. In the case of a smart white board, a smart television, a conference room display, a sales or museum display system or other type of larger display and system, the test configuration may be adapted. The loudspeaker may be lowered with respect to the system and moved farther away. Similarly for a vehicle system, the position of the loudspeaker may be adjusted. In any case, the test configuration is adjusted to simulate the position of the user or other audio source with respect to the computing or communication device and to provide an acoustic signal that reaches the two microphones at the same time. In some systems, one microphone is positioned farther away from an intended position of a speaker so that there is an intended delay between the two microphones. For these systems the loudspeaker may be position evenly between the two microphones or in a position that simulates the intended position of a speaker.

The loudspeaker generates acoustic energy within a sound field that is maximized along its acoustical axis and is dispersed horizontally and vertically from that axis. In some cases, the loudspeaker may also be selected to have an approximately even dispersion of acoustical energy horizontally and vertically across the dispersion angles that are used in the field test. It is also selected for even distribution of high and low frequencies, between the woofer and tweeter, across the sound field. While a two-way loudspeaker system with dynamic voice coil drivers is shown, any other type of loudspeaker may be used with more or fewer drivers of different types. With more than one driver, the drivers are arranged so that the distance from each driver to any one single microphone is the same. Otherwise, the different distances must be compensated during the analysis. The loudspeaker is also selected to have an approximately linear frequency response so that lower frequency sounds are produced with about the same acoustic energy as higher frequency sounds across the useful range. As described herein, useful tests may be performed with a frequency range of about 100 Hz to 8000 Hz so that many suitable loudspeakers are available. A wider or narrower frequency range may be used depending on the intended application for the microphone system. A standard active studio monitor loudspeaker for near field listening provides a suitable acoustical source. However, other types of acoustical sources may be used instead.

Figure 4:
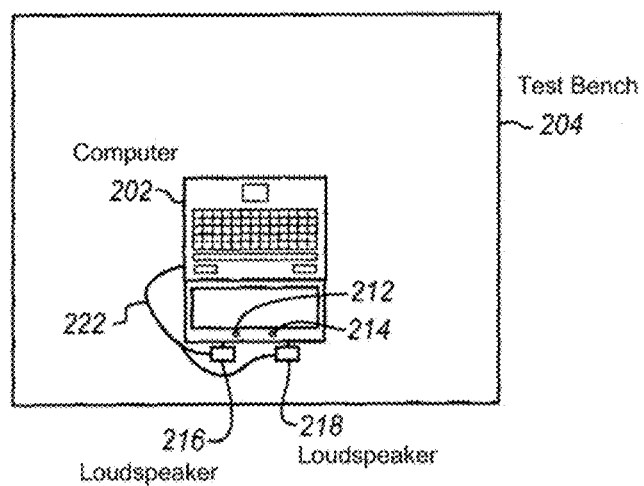
FIG. 4 is a top plan view of an alternative test configuration using a different loudspeaker arrangement according to an embodiment.

FIG. 4 is a top plan view that shows an alternative test configuration in which there are two loudspeakers 216, 218 each coupled to a respective microphone 212, 214. The two loudspeakers are placed directly in front of the corresponding microphone so that most of the acoustical energy is coupled to only one of the microphones. The microphones may be a suitable studio monitor or with a much shorter distance from loudspeaker to microphone, a smaller driver may be used. As an example, the loudspeakers 216, 218 may each be an earphone, earbud, earpiece, or headphone component. The left ear piece may be acoustically coupled to one of the microphones of a pair and the right ear piece may be acoustically coupled to the other microphone of the pair. The drivers may each be held in a suitable test stand or attached directly to the computer housing. Many wearable speaker systems provide a wideband signal with sufficient energy to replicate a user in the position as shown by the loudspeaker of FIG. 2.

To drive a test, the loudspeaker is coupled to a test signal driver. In the example of FIG. 2, the active studio monitor loudspeaker 206 is coupled to the headphone output of the computer 202 with a suitable cable 220. Similarly in FIG. 4, the in-ear headphones 216, 218 are attached to the computer 202 with a standard stereo cable 222. By providing a monaural signal over the stereo cable, the two drivers 216, 218 will produce the same sound at the same time. By using the computer to generate the sound signals for test the test hardware is simplified. However, a discrete test system, signal generator or other sound source (not shown) may be used instead of the computer. As described below, the sound generation system may be independent from the phase detection and measurement system.

Returning to FIG. 1, at 108 a test is performed to determine if there is any phase mismatch between any one pair of microphones in the computing or communications device. To perform such a detection, a test sound is generated via the one or more loudspeakers in a test setup as shown, for example, in FIGS. 1-3. The sound may be a single tone at a single audio frequency or a more complex chirp. A single frequency may be used for significant phase mismatches, however, in some cases the phase mismatch varies with audio frequency. As a result, the mismatch will only show at certain frequencies. A single frequency tone may or may not show the phase mismatch, depending on the response of the microphones at that frequency.

A more comprehensive detection signal is a linear or logarithmic swept-frequency cosine signal with an instantaneous frequency that covers different frequencies through the sweep. A variety of different frequency bands may be selected. For voice systems, a frequency band from 100-200 Hz to 6000-8000 Hz may be used. In the described examples the frequency band ranges from 100 Hz to 8000 Hz. A wider or narrower band may be used depending on the intended use and accuracy of the system. The responses to the chirp signal from the two microphones are divided into frames covering a selected number of instantaneous frequency periods.

The audio signal is received by the microphones and then captured for comparison. As described herein, typically microphones will be compared in pairs, however, after a reference microphone is selected, all of the microphones may be compared to the reference at the same time. The audio may be captured in an internal memory or mass storage of the device or in an audio processor of the device. The audio may be captured in the time domain as digital samples generated by the microphone or after further processing. In some embodiments, the digital samples are provided to an FFT engine and the converted frequency domain samples are saved for determining delay. The audio signals may be captured at any point in the audio processing pipeline before the audio from multiple microphones is combined. By capturing the audio at a later stage in the audio processing pipeline more of the possible sources of delay may be detected and compensated.

Figure 5:
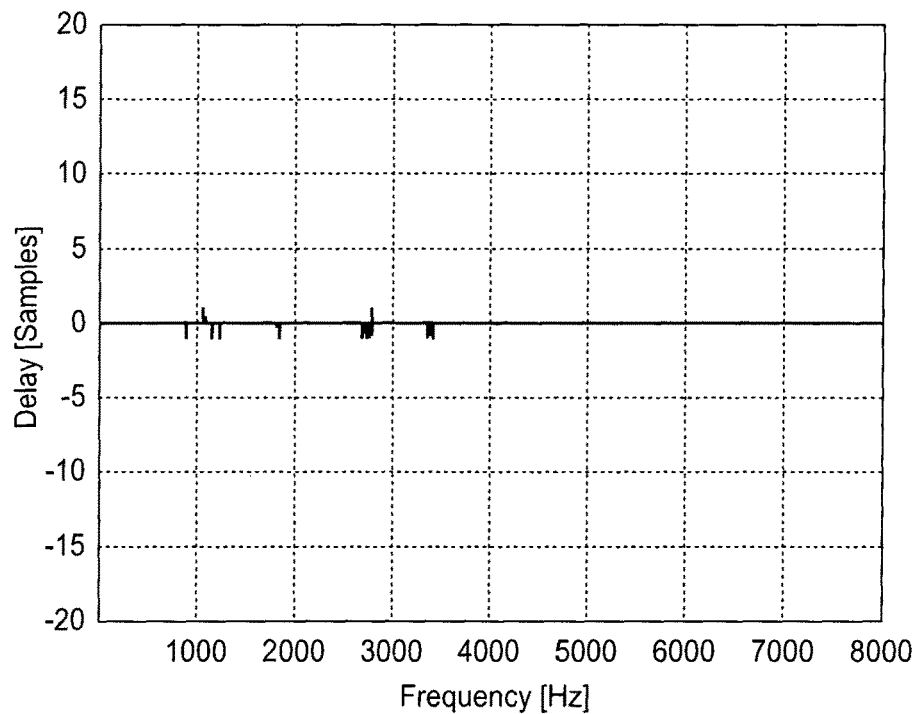
FIG. 5 is a graph of delay versus frequency for two microphones as measured according to an embodiment.

FIG. 5 is a graph of delay versus frequency to provide example results for a phase detection measurement. Such a result may be obtained, for example using three periods of a frequency sweep chirp signal applied to a notebook computer with two spaced apart microphones as show in FIG. 2. The audio is sampled with a standard frame rate as the frequency changes. Alternatively, the frame length can be adjusted to the wavelength of the currently analyzed instantaneous frequency of the chirp signal. Then for each frame, the delay between two microphones is estimated using a cross-correlation. As the chirp signal sweeps across frequency in time, each time frame corresponds to a different audio frequency band. A non-zero delay indicates a phase mismatch between the two microphones for the frequency range covered by the analysis time frame.

The results of FIG. 5 show measured delay from about 100 Hz to 8000 Hz using a sweep signal. The device measured in FIG. 5 has almost no phase mismatch. There are two frequencies at about 1200 Hz and 2800 Hz with a positive delay of about 1 sample. There are about 12 frequencies with a negative delay of about one sample. The positive delay indicates that the sound is received from the reference microphone about one sample time before the sound is received from the second microphone. The negative delay indicates that the sound is received at the reference microphone later than at the first microphone. For a standard sampling rate of about 48 kHz, a one sample delay is about 20 microseconds. Such a phase difference is small enough that it will not significantly impact audio beam forming and other features for the normal voice system frequency band and a microphone distance of several centimeters.

Figure 6:
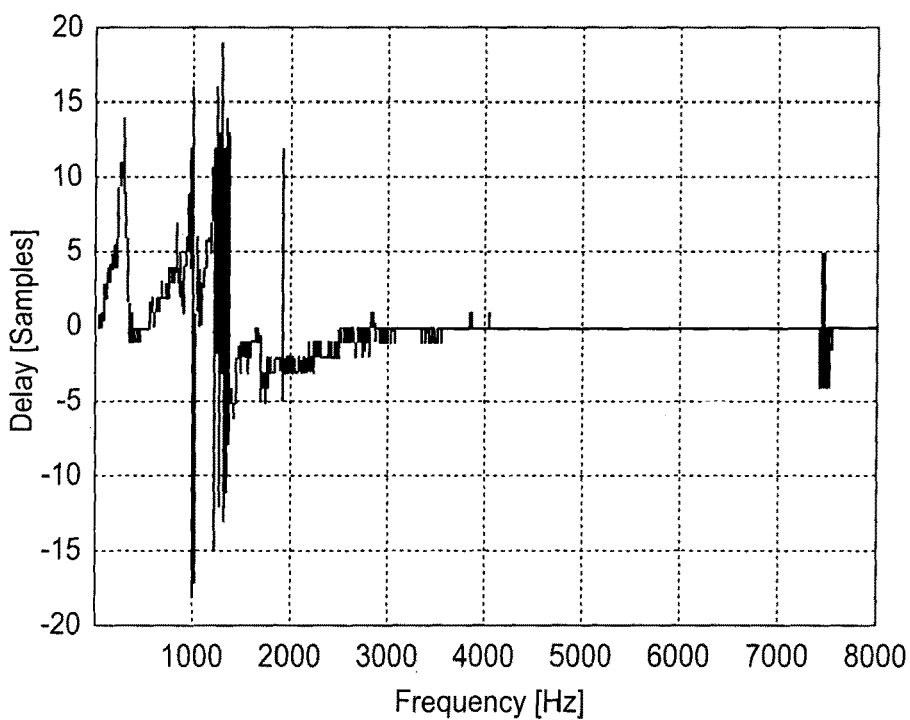
FIG. 6 is a graph of delay versus frequency for two different microphones as measured according to an embodiment.

FIG. 6 is an example of the same measurement applied to a different notebook computer. This device shows rapid variations of almost 40 samples for some frequencies and no mismatch for other frequencies. Audio frequencies between about 1000 Hz and 1500 Hz are essentially unusable for phase comparison while audio frequencies from about 3000 Hz to 7300 Hz are very well matched between the two microphones. The difference between the device of FIG. 5 and the device of FIG. 6 may be a matter of production variations, changes in internal components that have the same design, or different models that are built to different designs or with different parts. The device of FIG. 6 is not able to accurately perform audio beam steering without some compensation or correction for the phase mismatch.

At block 110 of FIG. 1, for the case of FIG. 6, the phase mismatch characteristic is precisely estimated. For the case of FIG. 5 no further work is needed. The phase mismatch estimate and correction may be avoided if no or very little phase mismatch is detected at block 108. Phase mismatch estimation may be done by measuring the microphone responses to an excitation signal on a test bench as shown in FIG. 2. While the excitation signal for detection may be a simple frequency sweep or chirp. The excitation signal for a precise estimation may be more complex and may isolate frequency bands more carefully.

As in the detection stage, the test signal may be pre-recorded or it may be generated in a signal synthesizer. The excitation signal for detection may be short and simple. A frequency sweep chirp is not only short for a faster test but delayed responses to any one particular instantaneous frequency are partially masked by the following frequencies as the sound sweeps. For phase estimation a longer signal may be used. In some embodiments, the excitation signal starts and ends with a linear chirp. The start and end chirp are used to synchronize the starting and ending point of the signal. The linear chirp brings the driver, the microphones, and the audio processing chain to an operating state. Ideally, a longer chirp brings the system to a steady state, so that transient effects are eliminated from the test.

In between the chirps a series of intermediate cosine signals with fixed instantaneous frequencies are produced. The cosine signals are separated by silent periods or gaps. The instantaneous frequencies of the intermediate cosine signals change from a lowest frequency limit to a highest frequency limit with a fixed step. The lower and upper limits define the boundaries of the phase mismatch estimate. The step size defines the resolution. Each cosine signal in the series is time windowed. The windowing limits the loudspeaker inertia which is used to generate the excitation. The windowing allows the loudspeaker to rest so that it is not overheated. The frequency steps may be linear from lowest to highest or the frequency may hop in a particular pattern to distribute the load on the system more evenly across the frequency range.

Figure 7:
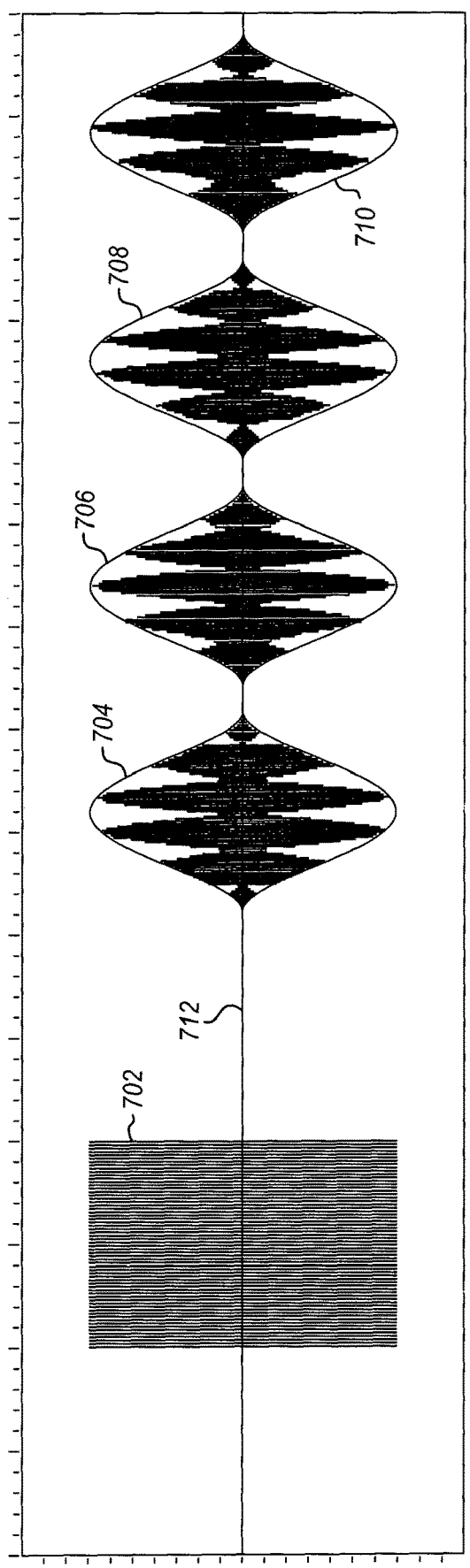
FIG. 7 is a graph of a portion of an example excitation signal to measure phase response mismatch at a particular frequency range according to an embodiment.

FIG. 7 is a graph of an example excitation signal with an initial chirp 702 and four intermediate cosine signals 704, 706, 708, 710. The signals are all aligned along a nominal pilot signal 712 at the baseline frequency. This signal extends out as far as the test cycle for each frequency. The intermediate cosine signals may then be followed by more cosine signals with linear chirps in the signal spaced at intervals and between the cosine signals. A variety of different components may be added to the excitation signal, depending on the loudspeaker and the microphones. As an example a linear sweep chirp may be used to exercise the voice coil and for start point and end synchronization. A unique signal may also be used to represent the end point. The sequence may be repeated exactly or approximately for all of the frequencies that are to be tested.

As shown in FIGS. 5 and 6, the phase mismatch may vary depending on audio frequency. The excitation signal uses narrowband signals to test the phase mismatch at different frequencies. These signals may be the cosine signals of FIG. 7 or they may have a different shape. A cosine or sine wave signal allows the phase to be measured at a particular frequency. The phase may be detected at using either cosine or sine wave signals. The frequency may be varied within a selected narrowband. A smoother waveform reduces any effect of loudspeaker or amplifier signal inertia.

The narrowband signals may be centered at different bands to test as many different frequencies as desired. The bands may be spaced apart as much as desired to provide the desired precision to the phase mismatch. As an example, the first set of narrowband pulses may be centered at about 100 Hz. The second set may be centered at 110 Hz. The sets may progress by 10 Hz intervals until the maximum audio frequency is reached such as 5000, 6000, 8000 or 12000 Hz. Instead of a linear progression of 10 Hz per set, the frequency may be increased exponentially or logarithmically. This allows for the entire range to be tested in less time. The entire test frequency range may be divided into e.g. 100 sections so that there are 100 different test sets to cover the entire frequency range. The test sets may be distributed in different ways and the number of test sets may be modified to suit different applications.

The Table shows an example waveform structure that may be used as an excitation signal in some embodiments.

TABLE

| Time Sequence | Signal Type | Frequencies | Use |
| --- | --- | --- | --- |
| 1 | Silence | | |
| 2 | Start Chirp | Full Range | Sync. |
| 3 | Silence | | |
| 4 | Sine Wave Sequence | $1^{st}$ Test Freq. | Phase test |
| 5 | Silence | | |
| 6 | Sine Wave Sequence | $2^{nd}$ Test Freq. | Phase test |
| 7 | Repeat 5, 6 | | |
| 8 | End Chirp | Full Range | Sync. |

Each of the signals in the overall excitation sequence may be modified to suit a variety of different purposes. The start and end chirps may use a linear or non-linear signal sweep and may start at a low, high or central frequency. The frequency range may be different from the frequency range for the phase mismatch testing. In one example, the range is selected based on the bandwidth limitations of the microphones and the connected audio processing pipelines. The silence periods allow for the system to cool and reset and allow for signals to be distinguished from each other.

The sine wave sequence may have any number of different waveforms which may be the same or different. The results from each waveform may be averaged or combined in another way to obtain a final phase mismatch value for each particular test frequency. In one embodiment, there are four sine waves, each centered about the test frequency and with the same number of periods. The same instantaneous frequency is used with a smooth amplitude modulation. The smooth modulation reduces impulse impacts from irregularities in the any part of the system. A phase shift may be used to further reduce irregularities in the system. As an example, the first and third waveforms may start in phase (0 radians shift) while the second and fourth waveforms start with inverse phase (Pi radians shift). The number and order of waveforms may be modified to suit different test scenarios and different devices.

While the excitation signal is played through to a pair of microphones, the responses to the excitation signal are recorded. The recording may be done at different places in the audio processing chain, depending on the nature of the device as described in more detail below. The recordings are used to find the starting and ending chirp positions for both microphone recordings using a cross-correlation technique. The chirp positions may be used to discover any constant and larger delay between both microphone recordings and then to time-align both recordings for further analysis. A constant delay may be taken into account when creating a final mismatch characteristic.

After time-aligning, both recordings are divided into time frames covering only one intermediate cosine signal from each microphone recording. Then the delay between cosine signals from both microphones is calculated using a cross-correlation. The delay estimation precision may be further improved using interpolation, such as a spline interpolation, between the maxima of the cross-correlation function or other improvement techniques. Using the maximum delay, whether from the cross-correlation or the interpolation, the maximum of the interpolation function may be used as the delay estimation.

Figure 8:
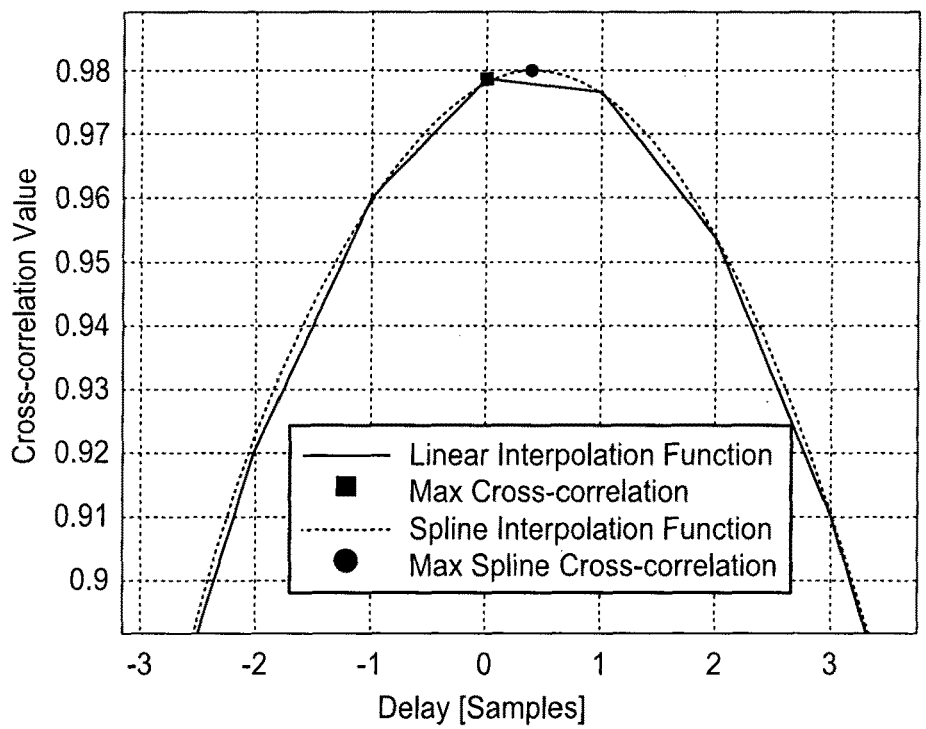
FIG. 8 is graph of delay in sample for an instantaneous frequency band versus cross-correlation values according to an embodiment.

FIG. 8 is a graph of delay in samples for a single narrow frequency band or instantaneous frequency plotted on the horizontal axis versus the cross-correlation values. The estimated time delays expressed in Radians for each instantaneous frequency of the analyzed intermediate cosine signals create the final phase mismatch characteristic. As shown, for a selected single instantaneous frequency estimate, the delay varies from about −2.5 samples to +3.2 samples. The cross-correlation for these data points reaches a maximum at about zero delay. The linear interpolation agrees with this value but the spline interpolation function has a maximum at about +0.5 samples delay. The graph of FIG. 7 shows that different values may be obtained using different processes. In this case any of the values may be used, however, better results may be obtained using the maximum spline interpolation. The value of +0.5 may then be used as the delay at this particular instantaneous frequency.

Figure 9:
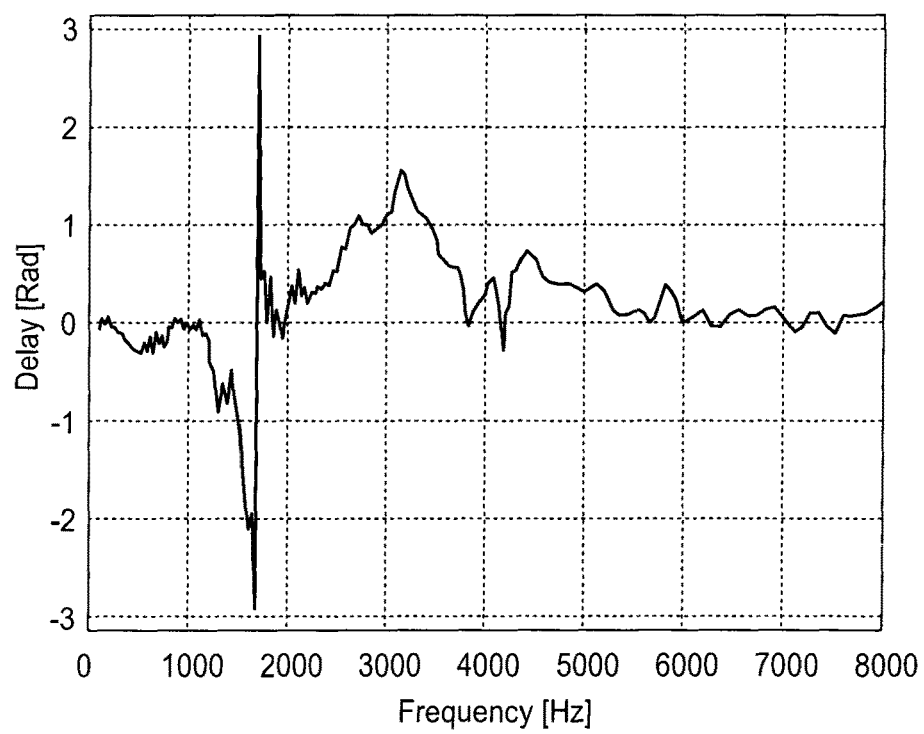
FIG. 9 is a graph of a phase mismatch correction characteristic for different frequencies according to an embodiment.

The process of cross-correlation and interpolation may be repeated for each excitation pulse at a particular frequency and then combined to obtain a final value for that frequency. This may then be done for each tested frequency. The results may be plotted on a graph such as that of FIG. 9. FIG. 9 shows the phase correction in radians on the vertical axis for different frequencies. While the graph of FIG. 6 shows the detection of the phase mismatch, the graph of FIG. 9 shows, a phase correction characteristic. Radian units provide a value that may be more directly applied to a phase correction system.

Figure 10:
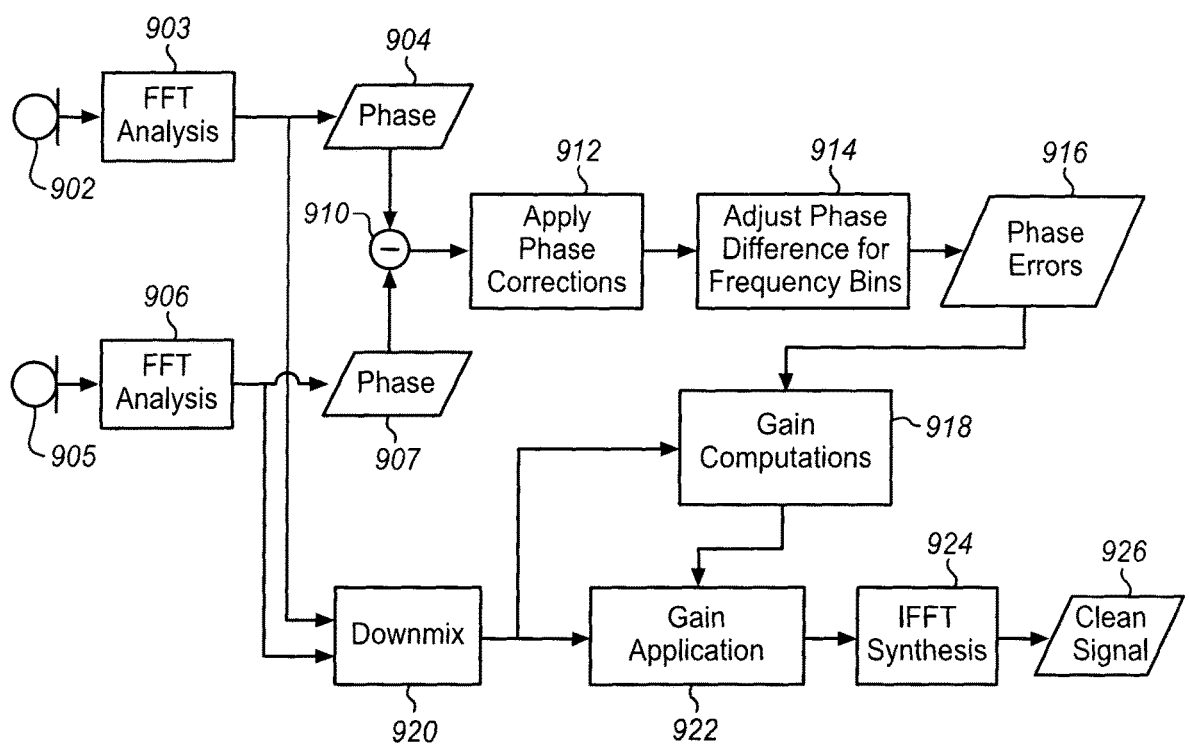
FIG. 10 is a block diagram of a phase-based beam former using phase correction according to an embodiment.

FIG. 10 is a block diagram of a phase-based beam former in which phase correction may be used. Such a beam former may be used in any of the devices mentioned above and for other types of systems. The phase corrections described herein may also be used for other types of systems that do or do not include beam forming. The beam forming system is provided as an example but embodiments are not limited to beam forming systems. The system has one pair of two microphones 902, 905 although there may be more. Each microphone has an audio input processing stage.

The beam formed by the beam former is a set of phases applied to the microphone audio so that sound from one direction is reinforced and sound from other directions is attenuated. The direction may correspond to a region that includes a user or main speaker, i.e., the source of the target speech. Another beam may correspond to a direction that includes a significant noise source. By identifying a noise beam, the noise may be isolated and attenuated. Alternatively, the noise may be assumed to be any sound from outside of the target source beam. The beam width may be fixed for simplicity, or adapted to suit different audio sources.

The first microphone 902 receives the audio pressure wave from the ambient environment and converts it to an analog voltage signal. The voltage signal is sampled in the microphone and converted to a sequence of digital samples. In typical devices, the audio samples are 16 bits and the sampling rate is 48 kHz. However other sampling rates and bit widths may be used. The microphone signal is provided to an FFT 903 to convert the audio samples from the time domain to the frequency domain. The FFT samples are then applied to a phase detection circuit 904 and also to a downmixer 920.

Similarly the second microphone 905 receives analog audio from the ambient and produces digital samples for an FFT 906. The microphones are located at different positions so each microphone receives signals corresponding to the same source at a slightly different time. The time difference corresponds to the difference in distance between the source and each microphone. The time difference of arrival may be characterized by phase in radians, by time in milliseconds, or by a number of digital audio samples.

The FFTs 903, 906 produce a discrete complex frequency spectrum which may have real and imaginary components at discrete frequencies, or frequency bins. The FFT outputs from each microphone are each applied to a respective phase detector 904, 906 and to a downmixer. For both microphones at each frequency bin, the phase is estimated at blocks 904, 906 from the complex spectrum.

The two phase detection results 904, 907 are provided to a comparator 910 to determine the phase difference. The phase difference may then be corrected with a phase correction block 914. The phase correction values 912 are determined for each FFT bin of the phase-based beamformer. These may be stored in a table as part of the platform tuning parameters. During processing the phase corrections are subtracted from the observed phase differences between the captured microphone signals in an adjustment block 914

The improved corrected phase differences are then used to determine the phase errors 916 or actual phase differences between the signals received at the two microphones for each frequency bin. In order to calculate a phase difference error 916, for each frequency bin, an allowable phase difference, may be computed up front using beam width, microphone placement, e.g., distance, sampling frequency and a processing block length, e.g., discrete Fourier transform length. The phase difference errors may be used to estimate noise and to calculate gain or attenuation factors to be applied to the downmixed audio signals.

The phase errors are applied to gain computation block 918. The gain computations may include noise and attenuation factors and may use different values for different FFT frequency bins. The outputs of the FFTs 903, 906 for each microphone signal are supplied to a downmixer 920. The gain computation block receives the downmixed audio signals 920 and applies the computed gains to an amplifier 922. The gains are applied 922 to the downmixed signal which is then converted back to the time domain by IFFT synthesis. The result is a clean audio signal 926 in which the audio from the two microphones is accurately combined. The beam former also produces accurate corrected phase error 916 values that may be used to localize sound sources, to distinguish different speakers and for many other purposes. While only two microphones are shown, the phase corrections 912 may be applied to many more simultaneous microphones in the same way.

The phase corrections 912 result in more accurate time difference of arrival estimations for each frequency component. This improves the accuracy of the beam former processing by mitigating the mismatched phase response of the elements in the microphone array. Without the phase corrections applied for the mismatched frequencies the processing would attenuate the desired signal and preserve particular noise arriving from the direction determined by the phase mismatch. Phase correction may also be used for sound source localization and dynamic beam steering. When the corrected phase values are used to combine multiple microphone signals a much cleaner audio signal is received. This may be used to improve the performance of Automatic Speech Recognition (ASR) systems by decreasing Word Error Rates (WER).

Knowing the phase mismatch characteristic, such as that shown in FIG. 8, allows for corrections to be applied in, for example, a phase-based beam former. In order to do so, the measured phase mismatch response is adapted to the frequency resolution of the beam former's FFT (Fast Fourier Transform). Using the technique described above, the phase response will have a higher resolution than the FFT. In some embodiments, the high resolution phase mismatch is adapted by converting the measured phase difference values to complex numbers. Equation 1 provides an example of one approach for expressing the phase difference.

$$x(f) = \cos(p(f)) + i \sin(p(f)) = e^{ip(f)} \quad \text{Eq. 1}$$

where $x(f)$ is a complex number value and $p(f)$ is the measured phase difference for a frequency f. The frequency is based on the center frequency of each test signal. These frequencies may also be selected to coincide with the frequency bins of the FFT. If they do not align, then the test frequencies may be mapped to the frequency bins so that there is phase correction value for each frequency bin.

The sum c(i) of the complex numbers for each FFT bin may be determined as shown in Equation 2, where (i) indicates a frequency bin of the FFT. The argument of the sum is the phase correction that is applied during processing in the look-up table 912 or other device. If the magnitude is not used it does not need to be normalized.

$$c(i) = \arg(\Sigma_{f=freq\_low(i)}^{freq\_hi(i)} x(f)) \quad \text{Eq. 2}$$

where freq_low(i) and freq_hi(i) are the boundaries of the FFT bin with index i.

A simpler averaging approach may alternatively be used. While this approach is more complex, it produces better results when the phase mismatch for different test frequencies within the same FFT bin are very different. As an example, if some of the phase mismatch values for a particular FFT bin are close to negative π (−180 degrees) and other phase mismatch values are close to positive π (180 degrees), the simple phase average would be zero or close to zero. There would be little or no phase correction. On the other hand, using the complex number form of Eq. 1 for the averaging of Eq. 2 gives a more relevant averaged correction of either +π or −π. These values both provide a more accurate correction than zero because they both represent a signal that is completely out of phase by the same amount.

Figure 11:
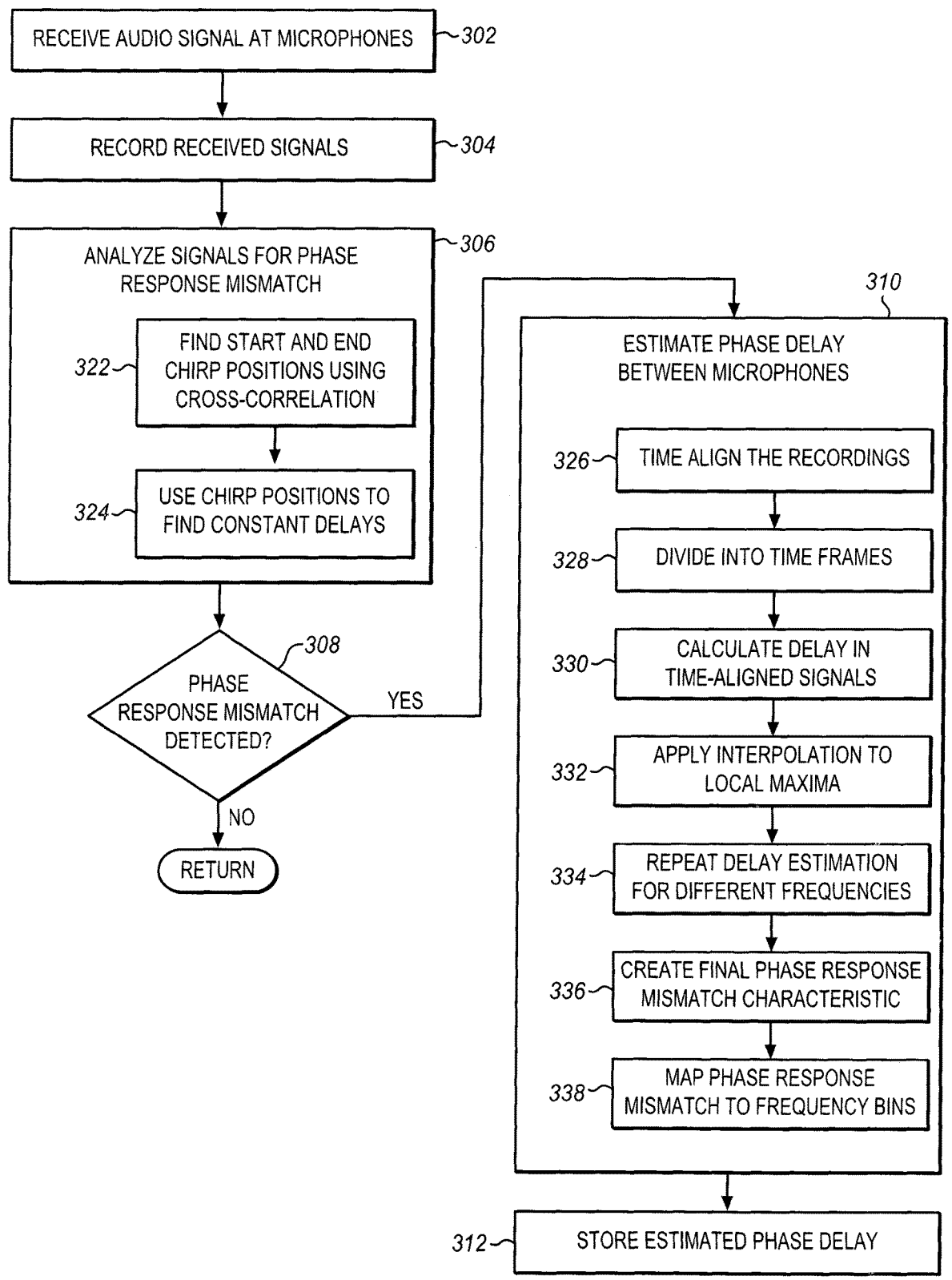
FIG. 11 is a process flow diagram of determining phase correction values for a phase-based beam former or other device according to an embodiment.

FIG. 11 is a process flow diagram of determining phase correction values for the beam former described above. The same phase correction values may be applied to many other types of systems which receive audio from one source through two or more microphones or audio processing pipelines. The process flow has been described briefly in the context of FIG. 1. FIG. 11 describes some of the operations of FIG. 1 in more detail.

At 302, a single audio signal from a single source is received at a first microphone and at a second microphone. The microphones are coupled to a single device for combining the received audio. At 304, this received audio as it comes from the two or more microphones is recorded. The signals from the microphones are not combined so they may be compared in phase.

At 306 the signals are analyzed to determine whether a phase response mismatch can be detected in the recording. The phase response mismatch is between audio received at the second microphone and the audio received at the first microphone. This analysis may be performed in a variety of different ways. In some embodiments, the responses to the excitation signal are separately recorded for both microphones and then at 322 the starting and ending chirps' positions in both responses are searched using a cross-correlation technique. At 324 the positions are used to discover any constant delay between both microphone recordings.

At 308, there is a decision as to whether a phase response mismatch has been detected. If so, then at 310, a phase delay between the second microphone and the first microphone is estimated. This may also be done in a variety of different ways. In some embodiments, at 326 the two recording are aligned in time using the chirp signals. After time-aligning, both recordings are divided into time frames at 328. The time frames cover only one intermediate cosine signal from each microphone recording. These small frames are for ease of use, but other time units may be used instead. Then at 330 the delay between the cosine signals from both microphones is calculated using a cross-correlation. At 332 the delay estimation precision can then be further improved using a spline interpolation between the local maxima of the cross-correlation function. From this interpolation, the maximum of the interpolation function is used as the delay estimation.

The audio excitation signal may have signals at many different frequencies. These are typically provided in sequence with a start and end chirp at each end. Since the delay varies with frequency, the delay determination may then be repeated at 334 for each frequency in the signal. The estimated time delays for each instantaneous frequency of the analyzed intermediate cosine signals create the final phase mismatch characteristic at 336. The constant delay is taken into account when creating the final mismatch characteristic.

In some embodiments the microphone audio is first converted to the frequency domain for processing before it is sent or recorded for other purposes. In such a case, the phase response mismatch characteristic is matched to the frequency bins of the FFT process at 338. This allows the phase correction to be easily applied after the FFT conversion. Knowing the phase mismatch characteristic allows for corrections to be applied in a phase-based beam-former. In order to do so the measured phase mismatch response that is of high resolution needs to be adapted to the frequency resolution of the beam-former's FFT. This may be done by converting the measured phase difference values to complex numbers. The sum of the complex numbers for each FFT bin can be calculated and the argument of the sum may be used the phase correction that is applied during processing. The magnitude of the sum is not needed for a phase correction.

At 312, the final estimated phase delay is stored for use in correcting the phase delay in received audio before combining the received audio from the two or more microphones. During processing the phase corrections are subtracted from the observed phase differences between the captured microphone signals resulting in better time difference of arrival estimations for each frequency component.

Figure 12:
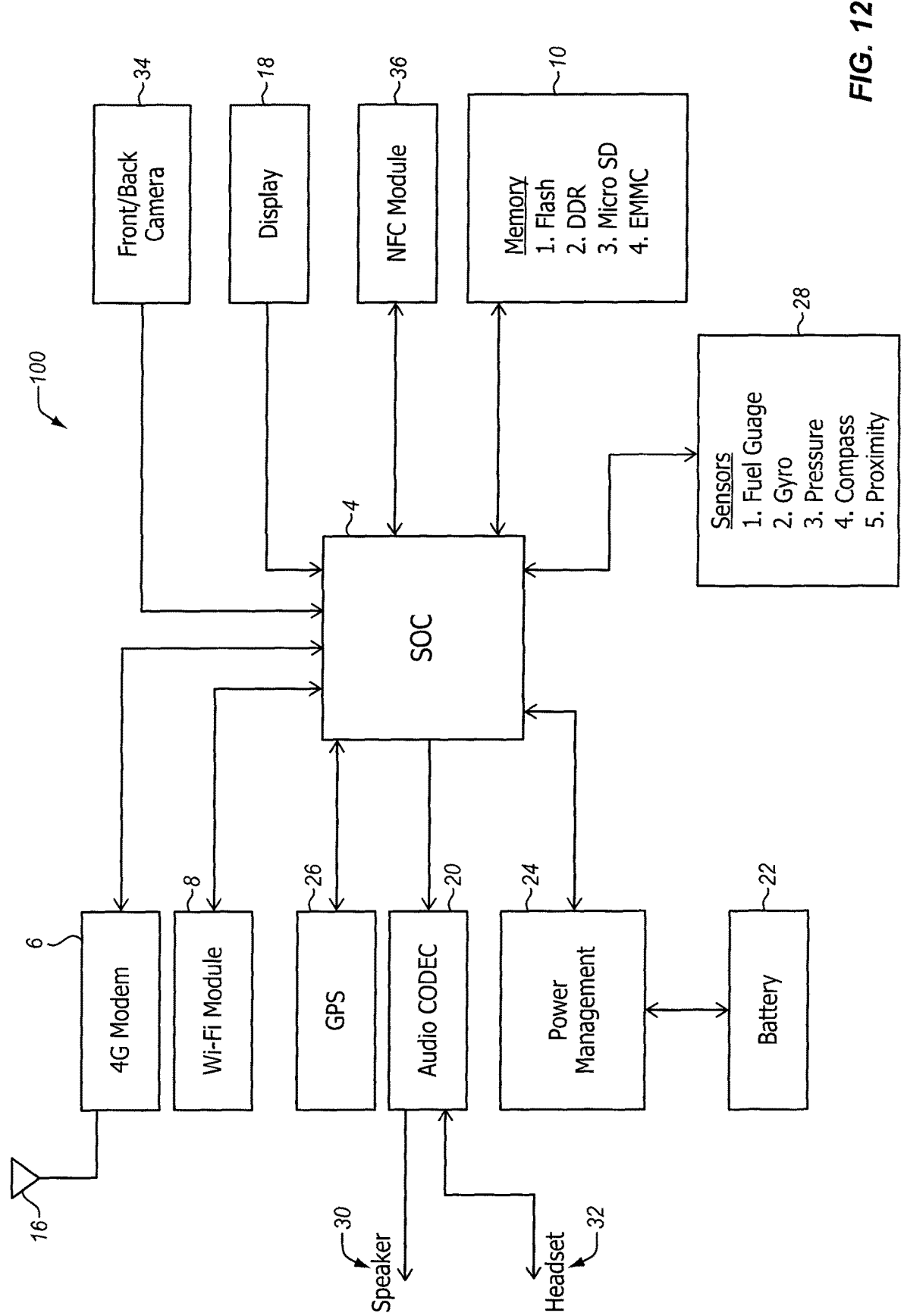
FIG. 12 is a block diagram of a communications device incorporating microphone phase detection and correction according to an embodiment

FIG. 12 illustrates a communications device 100 in accordance with one implementation. The device 100 may include a number of components, including but not limited to a processor and at least one communication package 6. The communication package is coupled to one or more antennas 16. The processor, in this example is housed with a SoC (System on a Chip) 4 which is packaged. The package is physically and electrically coupled to a system board.

Depending on its applications, the SoC may include other components that may or may not be on the same chip or in the same package. These other components include, but are not limited to, volatile memory (e.g., DRAM), non-volatile memory (e.g., ROM), flash memory, a graphics processor, a digital signal processor, a crypto processor, and a chipset. The SoC is coupled to many other components that may be on the same or a different attached system board. These include the antenna 16, a display 18 such as a touchscreen display with a touchscreen controller, a battery 22 and associated power management system 24, an audio codec 20, a video codec (not shown), a power amplifier (not shown), a global positioning system (GPS) device 26, a sensor suite 28, which may include a compass, an accelerometer, a gyroscope, a proximity sensor, a pressure sensor, a battery fuel gauge etc. The SoC may also be connected to a speaker 30, a microphone array 32, a camera array 34, and a mass storage device (such as flash cards, hard disk drive, etc.) 10, an NFC (Near Field Communication) module 36, any of a variety of other peripheral devices, including players for optical disks and other external media (not shown).

The communication package enables wireless and/or wired communications for the transfer of data to and from the communications device 100. Such systems currently may include a cellular telephony modem 6, a WiFi module 8, and any of a variety of other components. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The audio player device 100 may include a plurality of communication modules 6, 8. For instance, a first communication package may be dedicated to shorter range wireless communications such as Wi-Fi and Bluetooth and a second communication package may be dedicated to longer range wireless communications such as GPS, EDGE, GPRS, CDMA, WiMAX, LTE, Ev-DO, and others. The wireless communications package may also include components for receiving broadcast signal from terrestrial or satellite transmitters, including AM and FM radio, DAB (Digital Audio Broadcasting) and satellite radio.

In various implementations, the communications device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The communications device may be fixed, portable, or wearable. In further implementations, the audio player device 100 may be any other electronic device that provides analog audio through wires.

As an audio receiver, the device 100 receives audio from the microphone array 32 from one or more intended sources, such as a user or other speakers. Additional audio may be received remotely from microphones of other devices, such as wearable microphone, and other smart devices through any of the communications interfaces 6, 8. The SoC 4 feeds the additional audio to the audio codec 20 which contains the amplifiers and noise cancellation circuitry as described above. The audio codec may store the audio, return it to the SOC for transmission or analysis or even convert the received audio to an analog form suitable for amplification to the speaker 30.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving audio from a first microphone and from a second microphone, the microphones being coupled to a single device for combining the received audio, recording the received audio from the first microphone and the second microphone before combining the received audio, detecting a phase response mismatch in the recording at the device between the audio received at the second microphone and the audio received at the first microphone, if a phase response mismatch is detected, then estimating a phase delay between the second microphone and the first microphone, and storing the estimated phase delay for use in correcting the phase delay in received audio before combining the received audio.

Further embodiments include generating an audio test signal at the device and playing the audio test signal through a loudspeaker to generate the received audio.

In further embodiments the audio test signal includes an audio frequency sweep across an audio frequency range.

In further embodiments the audio test signal includes a plurality of instantaneous frequency signals at a plurality of different instantaneous frequencies, each separated by a silence.

In further embodiments the instantaneous frequency signals include a repetition of each different instantaneous frequency with a different phase.

In further embodiments the received audio has a start signal and an end signal and wherein estimating a phase delay comprises finding the start signal and the end signal for the first and the second microphone in the recorded audio and aligning the recorded audio using the found start signal and end signal.

In further embodiments estimating a phase delay comprises selecting an instantaneous frequency signal in the recorded audio for the first microphone and for the second microphone and determining the delay between the two microphones for the selected signal, wherein the selected signal has a single frequency and is between the start signal and the end signal.

In further embodiments determining the delay comprises cross correlating the selected signal from the first microphone with the selected signal from the second microphone.

In further embodiments determining the delay comprises applying a spline interpolation to maxima of the cross correlation.

Further embodiments include converting the audio for each microphone in a respective FFT engine before recording, each FFT engine providing audio in a plurality of different frequency bins, and wherein estimating a phase delay comprises repeating selecting an instantaneous frequency signal and determining the delay for a plurality of signals within an audio frequency range that corresponds to a frequency bin of the FFT engines and combining the determined delays to determine a delay for the corresponding frequency bin.

In further embodiments combining the determined delays comprises converting each delay to a complex number representation of the delay and summing the complex number representations.

Further embodiments include taking the argument of the sum of complex numbers as the estimated phase delay for the frequency bin.

In some embodiments a machine-readable medium has instructions thereon that when operated on by the machine cause the machine to perform operations that include receiving audio from a first microphone and from a second microphone, the microphones being coupled to a single device for combining the received audio, recording the received audio from the first microphone and the second microphone before combining the received audio, detecting a phase response mismatch in the recording at the device between the audio received at the second microphone and the audio received at the first microphone, if a phase response mismatch is detected, then estimating a phase delay between the second microphone and the first microphone, and storing the estimated phase delay for use in correcting the phase delay in received audio before combining the received audio.

Further embodiments include generating an audio test signal at the device and playing the audio test signal through a loudspeaker to generate the received audio.

In further embodiments the audio test signal includes an audio frequency sweep across an audio frequency range.

In further embodiments the audio test signal includes a plurality of instantaneous frequency signals at a plurality of different instantaneous frequencies, each separated by a silence.

Some embodiments pertain to an apparatus that includes a first microphone to receive a test signal, a second microphone to receive the test signal, a memory to record the received audio from the first microphone and the second microphone before combining the received audio, and a processor to detect a phase response mismatch in the recording at the apparatus between the audio received at the second microphone and the audio received at the first microphone, if a phase response mismatch is detected, then to estimate a phase delay between the second microphone and the first microphone, and to store the estimated phase delay in the memory for use in correcting the phase delay in received audio before combining the received audio.

In further embodiments the received audio has a start signal and an end signal and wherein the processor estimates a phase delay by finding the start signal and the end signal for the first and the second microphone in the recorded audio and aligning the recorded audio using the found start signal and end signal.

In further embodiments estimating a phase delay comprises selecting an instantaneous frequency signal in the recorded audio for the first microphone and for the second microphone and cross correlating the selected signal from the first microphone with the selected signal from the second microphone.

Further embodiments include an FFT engine for each microphone to convert the audio for each microphone before recording, each FFT engine providing audio in a plurality of different frequency bins, and wherein estimating a phase delay comprises repeating selecting an instantaneous frequency signal and determining the delay for a plurality of signals within an audio frequency range that corresponds to a frequency bin of the FFT engines and combining the determined delays to determine a delay for the corresponding frequency bin

What is claimed is:
1. A method comprising:
receiving audio from a first microphone and from a second microphone, the microphones being coupled to a single device for combining the received audio;

recording the received audio from the first microphone and the second microphone before combining the received audio;

detecting a phase response mismatch in the recording at the device between the audio received at the second microphone and the audio received at the first microphone, wherein the phase response mismatch is determined at a plurality of frequencies via an excitation signal, wherein a cross-correlation and an interpolation is repeated for each excitation signal at the plurality of frequencies and then combined to obtain a final mismatch value for each frequency;

in response to detecting the phase response mismatch, estimating a phase delay between the second microphone and the first microphone, wherein estimating the phase delay comprises repeating selecting an instantaneous frequency signal and determining the phase delay for a plurality of signals within an audio frequency range that corresponds to a frequency bin of a respective FFT engine and combining the determined phase delays to determine a delay for the frequency bin; and storing the estimated phase delay for use in correcting the phase delay in received audio before combining the received audio.

2. The method of claim 1, further comprising generating an audio test signal at the device and playing the audio test signal through a loudspeaker to generate the received audio.

3. The method of claim 2, wherein the audio test signal includes an audio frequency sweep across an audio frequency range.

4. The method of claim 3, wherein the audio test signal includes a plurality of instantaneous frequency signals at a plurality of different instantaneous frequencies, each separated by a silence.

5. The method of claim 4, wherein the instantaneous frequency signals include a repetition of each different instantaneous frequency with a different phase.

6. The method of claim 1, wherein the received audio has a start signal and an end signal and wherein estimating a phase delay comprises finding the start signal and the end signal for the first and the second microphone in the recorded audio and aligning the recorded audio using the found start signal and end signal.

7. The method of claim 6, wherein estimating a phase delay comprises selecting an instantaneous frequency signal in the recorded audio for the first microphone and for the second microphone and determining the delay between the two microphones for the selected signal, wherein the selected signal has a single frequency and is between the start signal and the end signal.

8. The method of claim 7, wherein determining the delay comprises cross correlating the selected signal from the first microphone with the selected signal from the second microphone.

9. The method of claim 8, wherein determining the delay comprises applying a spline interpolation to maxima of the cross correlation.

10. The method of claim 7, further comprising converting the audio for each microphone in a respective FFT engine before recording.

11. The method of claim 1, wherein combining the determined delays comprises converting each delay to a complex number representation of the delay and summing the complex number representations.

12. The method of claim 11, further comprising taking an argument of the sum of complex numbers as the estimated phase delay for the frequency bin.

13. A machine-readable medium having instructions thereon that when operated on by the machine cause the machine to perform operations comprising:

receiving audio from a first microphone and from a second microphone, the microphones being coupled to a single device for combining the received audio;

recording the received audio from the first microphone and the second microphone before combining the received audio;

detecting a phase response mismatch in the recording at the device between the audio received at the second microphone and the audio received at the first microphone, wherein the phase response mismatch is determined at a plurality of frequencies via an excitation signal, wherein a cross-correlation and an interpolation is repeated for each excitation signal at the plurality of frequencies and then combined to obtain a final mismatch value for each frequency;

in response to detecting the phase response mismatch estimating a phase delay between the second microphone and the first microphone, wherein estimating the phase delay comprises repeating selecting an instantaneous frequency signal and determining the phase delay for a plurality of signals within an audio frequency range that corresponds to a frequency bin of a respective FFT engine and combining the determined phase delays to determine a delay for the frequency bin; and storing the estimated phase delay for use in correcting the phase delay in received audio before combining the received audio.

14. The medium of claim 13, the operations further comprising generating an audio test signal at the device and playing the audio test signal through a loudspeaker to generate the received audio.

15. The medium of claim 14, wherein the audio test signal includes an audio frequency sweep across an audio frequency range.

16. The medium of claim 15, wherein the audio test signal includes a plurality of instantaneous frequency signals at a plurality of different instantaneous frequencies, each separated by a silence.

17. An apparatus comprising:

a first microphone to receive a test signal;

a second microphone to receive the test signal;

a memory to record the received audio from the first microphone and the second microphone before combining the received audio; and a processor to:

detect a phase response mismatch in the recording at the apparatus between the audio received at the second microphone and the audio received at the first microphone, wherein the phase response mismatch is determined at a plurality of frequencies via an excitation signal, wherein a cross-correlation and an interpolation is repeated for each excitation signal at the plurality of frequencies and then combined to obtain a final mismatch value for each frequency;

in response to detecting the phase response mismatch, estimate a phase delay between the second microphone and the first microphone, wherein estimating the phase delay comprises repeating selecting an instantaneous frequency signal and determining the phase delay for a plurality of signals within an audio frequency range that corresponds to a frequency bin of a respective FFT engine and combining the determined phase delays to determine a delay for the frequency bin; and store the estimated phase delay in the memory for use in correcting the phase delay in received audio before combining the received audio.

18. The apparatus of claim 17, wherein the received audio has a start signal and an end signal and wherein the processor estimates a phase delay by finding the start signal and the end signal for the first and the second microphone in the recorded audio and aligning the recorded audio using the found start signal and end signal.

19. The apparatus of claim 18, wherein estimating a phase delay comprises selecting an instantaneous frequency signal in the recorded audio for the first microphone and for the second microphone and cross correlating the selected signal from the first microphone with the selected signal from the second microphone.

20. The apparatus of claim 17, further comprising an FFT engine for each microphone to convert the audio for each microphone before recording.

\* \* \* \* \*